United States Patent
Eatough

(10) Patent No.: US 7,949,641 B1
(45) Date of Patent: May 24, 2011

(54) SYSTEMS AND METHODS FOR VALIDATING A PORTION OF A FILE THAT IS DOWNLOADED FROM ANOTHER COMPUTER SYSTEM

(75) Inventor: David A. Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 241 days.

(21) Appl. No.: 11/354,547

(22) Filed: Feb. 15, 2006

(51) Int. Cl.
*G06F 7/00* (2006.01)
(52) U.S. Cl. ........................................ 707/705
(58) Field of Classification Search .................. 707/716, 707/694
See application file for complete search history.

(56) References Cited

U.S. PATENT DOCUMENTS

| 6,754,829 | B1 | 6/2004 | Butt et al. |
| 2002/0110084 | A1 | 8/2002 | Butt et al. |
| 2003/0140229 | A1 | 7/2003 | Heins |
| 2003/0187931 | A1 | 10/2003 | Olsen et al. |
| 2003/0233455 | A1* | 12/2003 | Leber et al. ............ 709/226 |
| 2004/0133520 | A1* | 7/2004 | Callas et al. ............ 705/51 |
| 2005/0273592 | A1* | 12/2005 | Pryor et al. ............ 713/150 |
| 2006/0212542 | A1* | 9/2006 | Fang et al. ............ 709/219 |
| 2007/0150595 | A1* | 6/2007 | Bhorania et al. ............ 709/226 |

* cited by examiner

*Primary Examiner* — Pierre M Vital
*Assistant Examiner* — Truong V Vo
(74) *Attorney, Agent, or Firm* — Austin Rapp & Hardman

(57) ABSTRACT

In an exemplary method that is performed by a first computer system, one or more file blocks are identified within a target file. The one or more file blocks comprise a desired portion of the target file. At least one file block is downloaded from a second computer system. However, the entire target file is not downloaded. A previously calculated validation value is received for a file block that has been downloaded. A new validation value is calculated for the downloaded file block. If the new validation value for the file block does not match the previously calculated validation value for the file block, the file block is discarded.

21 Claims, 7 Drawing Sheets

SYSTEMS AND METHODS FOR VALIDATING A PORTION OF A FILE THAT IS DOWNLOADED FROM ANOTHER COMPUTER SYSTEM

TECHNICAL FIELD

The present invention relates generally to computers and computer-related technology. More specifically, the present invention relates to systems and methods for validating a portion of a file that is downloaded from another computer system.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
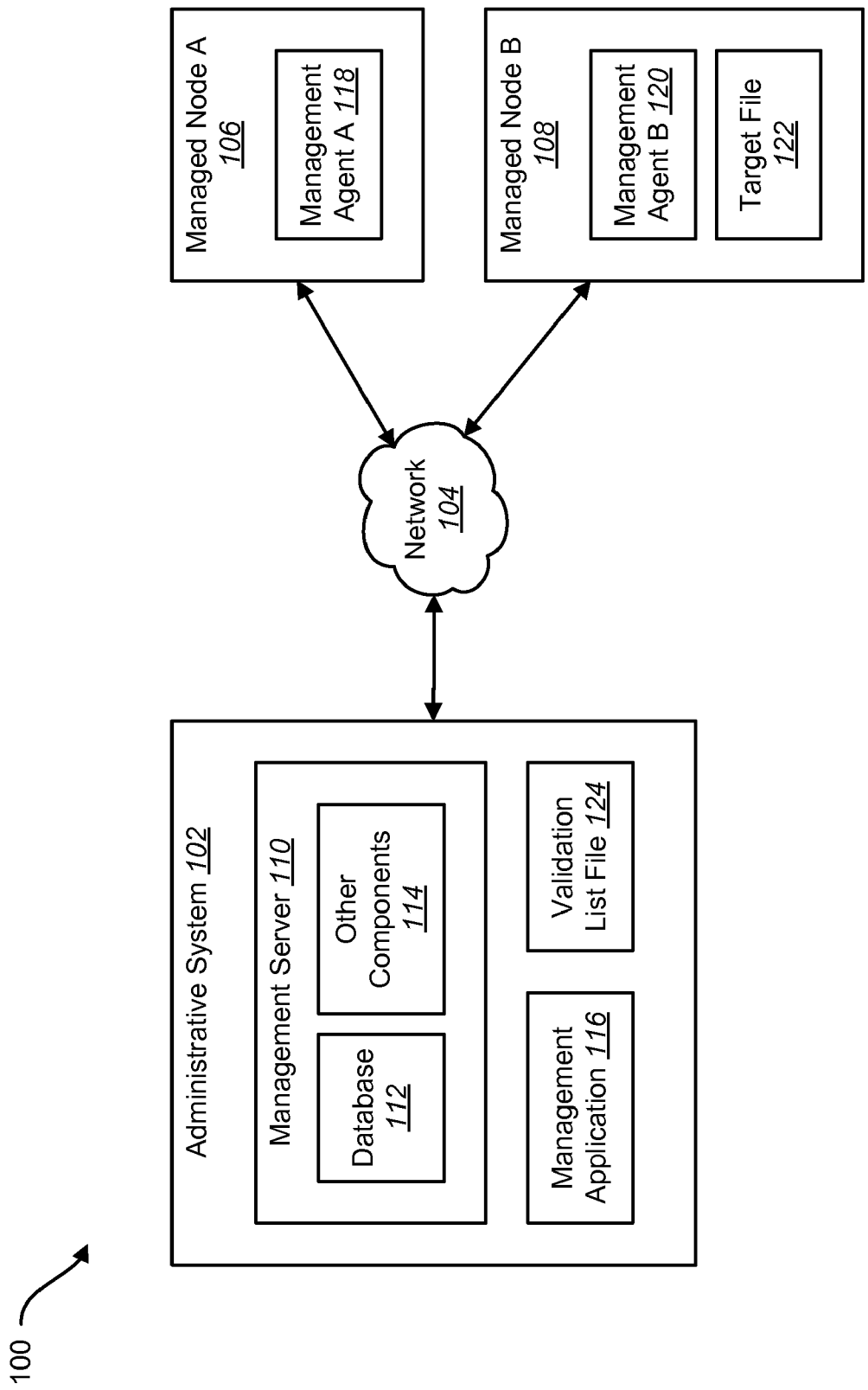
FIG. 1 illustrates an exemplary system in which some embodiments may be practiced, including an administrative system that comprises a validation list file for a target file.

Systems and methods for validating a portion of a file that is downloaded from another computer system are disclosed. In an exemplary embodiment, a first computer system is instructed to download a desired portion of a target file from a second computer system. The first computer system identifies one or more file blocks within the target file that comprise the desired portion of the target file, and downloads from the second computer system at least one of the one or more file blocks. However, the first computer system does not download the entire target file. For each file block that is downloaded, the first computer system calculates a new validation value for the file block, and compares it to a previously calculated validation value for the file block. The validation value may be a checksum, an MD5 hash value, an SHA-1 hash value, a portion of an SHA-1 hash value, etc. If the new validation value for the file block does not match the previously calculated validation value for the file block, the first computer system discards the file block and does not download any additional file blocks.

In some embodiments, the validation value for the file block may be received as part of a validation list file. The validation list file may be an XML document, an OpenPGP message, a binary file, etc. The validation list file may include previously calculated validation values for the file blocks within the target file. The validation list file may also include file block information, such as the starting and ending points of the file blocks in the target file, size information for the file blocks in the target file, etc.

The validation list file may include a digital signature. Where the validation list file includes a digital signature, the first computer system may attempt to validate the digital signature.

The first computer system may download file blocks from the second computer system one file block at a time. Alternatively, the first computer system may download multiple file blocks simultaneously from the second computer system.

The file blocks within the target file may be equally sized. Alternatively, at least some of the file blocks within the target file may be unequally sized.

A computer-readable storage medium for validating a desired portion of a target file that is downloaded from a second computer system is disclosed. The computer-readable storage medium may include executable instructions for identifying one or more file blocks within the target file that comprise a desired portion of the target file. The computer-readable storage medium may also include executable instructions for downloading from the second computer system at least one of the one or more file blocks without downloading the entire target file. The computer-readable storage medium may also include executable instructions for receiving a previously calculated validation value for a file block that has been downloaded. The computer-readable storage medium may also include executable instructions for calculating a new validation value for the file block. The computer-readable storage medium may also include executable instructions for discarding the file block if the new validation value for the file block does not match the previously calculated validation value for the file block.

The embodiments disclosed herein may be practiced in a wide variety of settings. For example, the first computer system may be a first managed node on a computer network, and the second computer system may be a second managed node or an administrative system on the computer network. As another example, the first computer system and the second computer system may be in electronic communication with one another via a peer-to-peer network. As yet another example, the first computer system may be a local proxy server or an installable file system.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Peer-to-peer multicast and other similar technologies enable sharing of files between computers. However, getting files from another computer system, such as a peer in a peer-to-peer network, may present a security concern. When one computer system makes a request for a file on another computer system, the requesting computer system runs the risk of downloading and executing a file that could cause harm to the system. This is because the file that is being requested may have been unintentionally altered by a virus or deliberately altered by a malicious user. To reduce the risk of harm to the requesting computer system, it is generally desirable to validate the downloaded file (i.e., to check the downloaded file for the presence of errors) before the data within the file is used.

One way to check for the presence of errors in a file is to download the entire file and check the file against a hash value. A hash value (or simply hash) is a number that is generated by applying a hashing algorithm to a set of data. The hash is typically substantially smaller than the data itself, and the characteristics of the hashing algorithm are such that it is extremely unlikely that other data will produce the same hash. A hash may also be referred to as a message digest. Some examples of hashing algorithms include variants of the Message Digest algorithm (e.g., MD4, MD5, etc.), variants of the Secure Hash Algorithm (e.g., SHA-0, SHA-1, etc.), and so forth.

The process of checking a downloaded file against a hash typically involves obtaining a previously calculated hash for the file, calculating a new hash for the file (using the same hashing algorithm that was used to calculate the previously calculated hash), and comparing the new hash with the previously calculated hash. If the new hash matches the previously calculated hash, then it may be concluded that the file has not been altered since the calculation of the previously calculated hash. However, if the new hash does not match the previously calculated hash, then it may be concluded that the file has been altered since the calculation of the previously calculated hash.

It may sometimes be desirable to download only a portion of a file that is located on another computer system. For example if a 20/20 software package is being installed, it may be desirable to download only the portion of the file that is actually needed. As another example, when extracting files from a CAB file (i.e., a file that contains one or more files, sometimes referred to as a cabinet file), it may be desirable to download only the portion of the CAB file that comprises the files to be extracted. However, if only a portion of a file is downloaded, then it is not possible to validate the downloaded portion using the approach described above, because the entire file is needed in order to be able to check the file against the previously calculated hash.

The embodiments disclosed herein relate generally to reducing the risk of harm to a computer system that is downloading a portion of a file from another computer system. Advantageously, the systems and methods disclosed herein make it possible to check for the presence of errors in the portion of the file that is downloaded, without the need to download the entire file.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only two managed nodes are shown in the system of FIG. 1, namely managed node A 106 and managed node B 108. Of course, the systems in which embodiments disclosed herein are practiced may include many additional managed nodes.

The administrative system 102 includes a management server 110. The management server 110 may include a database 112 of information. The management server 110 may also include various other components 114 that are configured to perform tasks such as scheduling, handling alerts, and so forth. An example of a management server 110 that may be used with embodiments disclosed herein is the core server for the LANDesk® Management Suite.

The administrative system 102 also includes a management application 116. The management application 116 may be used to perform various tasks related to the management of the computer network 104, such as remote control, software distribution, software license monitoring, operating system imaging and migration, IT asset management, problem resolution, and so forth. As part of performing these tasks, the management application 116 may connect to the management server 110 and query the management server 110 for information. An example of a management application 116 that may be used is the console application for the LANDesk® Management Suite.

To enable a user of the administrative system 102 to perform management tasks via the management application 116, the managed nodes in the system 100 each include a management agent. In particular, managed node A 106 includes management agent A 118, and managed node B 108 includes management agent B 120. The management agents in the system 100 perform management-related tasks in response to requests from the management application 116.

As part of performing a task related to the management of the computer network 104, the management application 116 may request that a management agent on a managed node download a portion of a file from another managed node or from the administrative system 102 itself. For example, the management application 116 may request that management agent A 118 download a portion of a file 122 from managed node B 108. This file 122 will be referred to herein as the target file 122.

A validation list file (VLF) 124 is created for the target file 122. The VLF 124 may be created by the management server 110 (or another component on the administrative system 102) prior to the management application 116 requesting that management agent A 118 download a portion of the target file 122 from managed node B 108. The VLF 124 may be transmitted to managed node A 106 and used to validate the portion of the target file 122 that is downloaded. This will be discussed in greater detail below.

Figure 2:
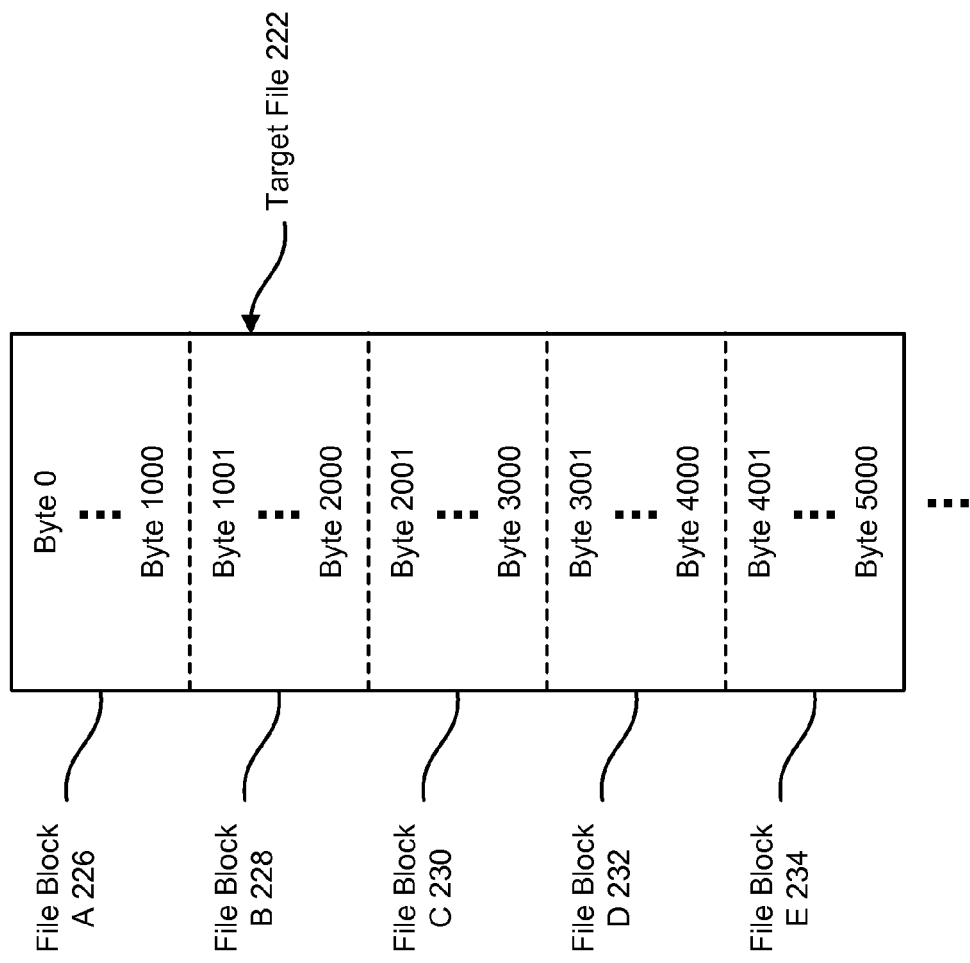
FIG. 2 illustrates an example of a target file that may be used.

In some embodiments, the VLF 124 may be generated by dividing the target file 122 into file blocks. FIG. 2 illustrates an example of a target file 222 that may be used. The target file 222 has been divided into several file blocks. Five file blocks are shown, namely file block A 226, file block B 228, file block C 230, file block D 232, and file block E 234. File block A extends from byte 0 to byte 1000 of the target file 222. File block B extends from byte 1001 to byte 2000 of the target file 222. File block C extends from byte 2001 to byte 3000 of the target file 222. File block D extends from byte 3001 to byte 4000 of the target file 222. File block E extends from byte 4001 to byte 5000 of the target file 222.

Figure 3:
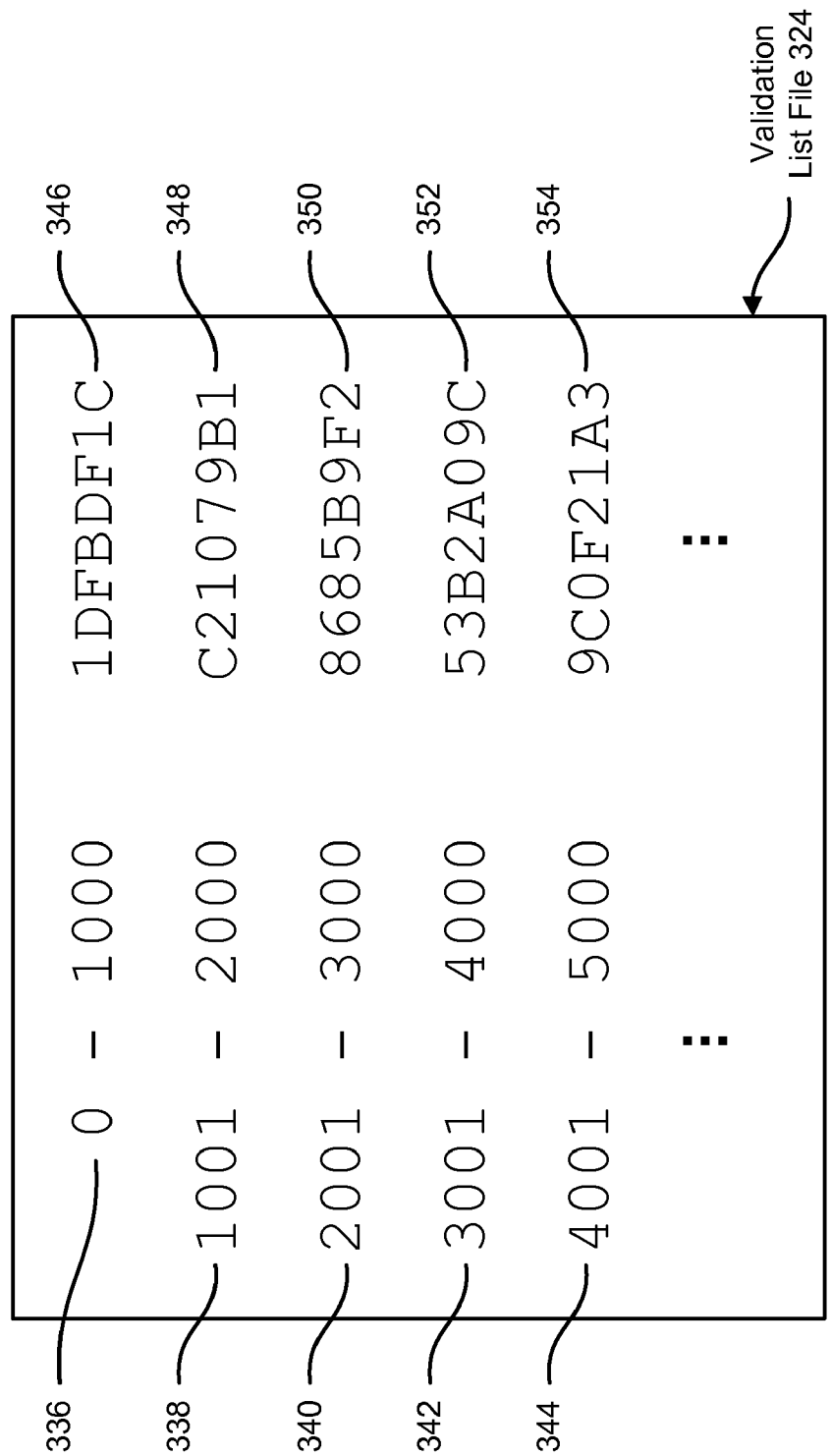
FIG. 3 illustrates an exemplary validation list file for the target file shown in FIG. 2.

FIG. 3 illustrates an exemplary validation list file 324, or VLF 324, for the target file 222 shown in FIG. 2. File block information (i.e., information about the file blocks in the target file 222) is included in the VLF 324. More specifically, the starting and ending points (e.g., the starting and ending bytes) for each file block are included in the VLF 324. The VLF 324 includes the starting and ending points 336 for file block A, the starting and ending points 338 for file block B, the starting and ending points 340 for file block C, the starting and ending points 342 for file block D, and the starting and ending points 344 for file block E. The starting point for a particular file block may be the byte where the file block begins. The ending point for a particular file block may be the byte where the file block ends.

The VLF 324 also includes a validation value for each file block in the target file 222. More specifically, the VLF 324 includes a validation value 346 for file block A, a validation value 348 for file block B, a validation value 350 for file block C, a validation value 352 for file block D, and a validation value 354 for file block E. A validation value, as used herein, is any number that is generated with respect to a set of data and that allows modifications within the data to be detected. A validation value may be generated with respect to a set of data by applying a validation algorithm (e.g., a hashing algorithm, a cyclic redundancy check algorithm, etc.) to the set of data. Some examples of validation values include a checksum, an MD5 hash, an SHA-1 hash, the first 8 bytes of an SHA-1 hash, etc.

Figure 4:
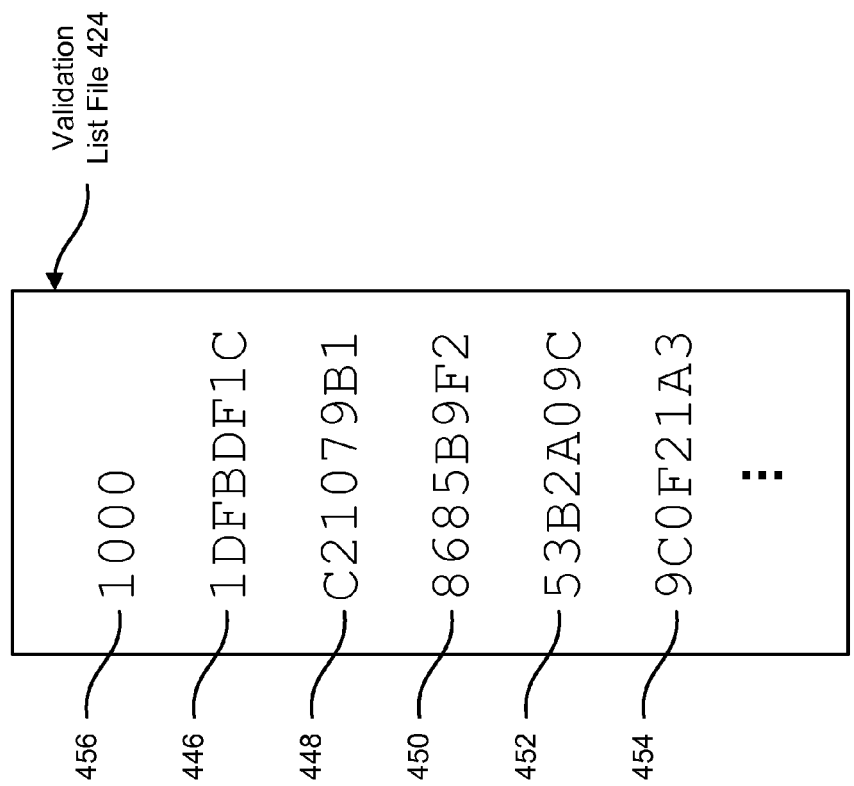
FIG. 4 illustrates another exemplary validation list file for the target file shown in FIG. 2.

FIG. 4 illustrates another exemplary validation list file, or VLF 424, for the target file 222 shown in FIG. 2. As before, information about the file blocks in the target file 222 is included in the VLF 424. However, in the illustrated embodiment, the VLF 424 does not include the starting and ending points for the file blocks in the target file 222. Instead, the VLF 424 includes size information 456 that specifies the size of the file blocks (e.g., 1000 bytes).

As before, the VLF 424 also includes a validation value for each file block in the target file 222. More specifically, the VLF 424 includes a validation value 446 for file block A, a validation value 448 for file block B, a validation value 450 for file block C, a validation value 452 for file block D, and a validation value 454 for file block E.

In some embodiments, a validation list file, or VLF, may not include any information about file blocks in a target file. In such embodiments, the size of the file blocks may be predefined and known by the component that calculates the validation values to be included in the VLF (e.g., the management server 110), and by any components that use the VLF to validate downloaded portions of the target file (e.g., management agent A 118 on managed node A 106).

Although the size of the file blocks shown in FIGS. 2-4 is 1000 bytes, a VLF may contain validation values for file blocks of any size. Also, although all of the file blocks are equally sized in FIGS. 2-4, validation values may be assigned for unequal portions of a target file (i.e., at least some of the file blocks within a target file may be unequally sized). For example, if a VLF is being created for a cabinet (CAB) file, the file blocks may be aligned with the files contained in the CAB file. Thus, when an individual file is downloaded from within the CAB file, it may be possible to validate that file using only one validation value.

There are a wide variety of possible formats for VLFs. For example, a VLF may be an XML document, an OpenPGP message, a binary file, etc. Also, in some embodiments, a VLF may include a digital signature indicating that it has been signed by a trusted entity, such as the management server 110.

Figure 5:
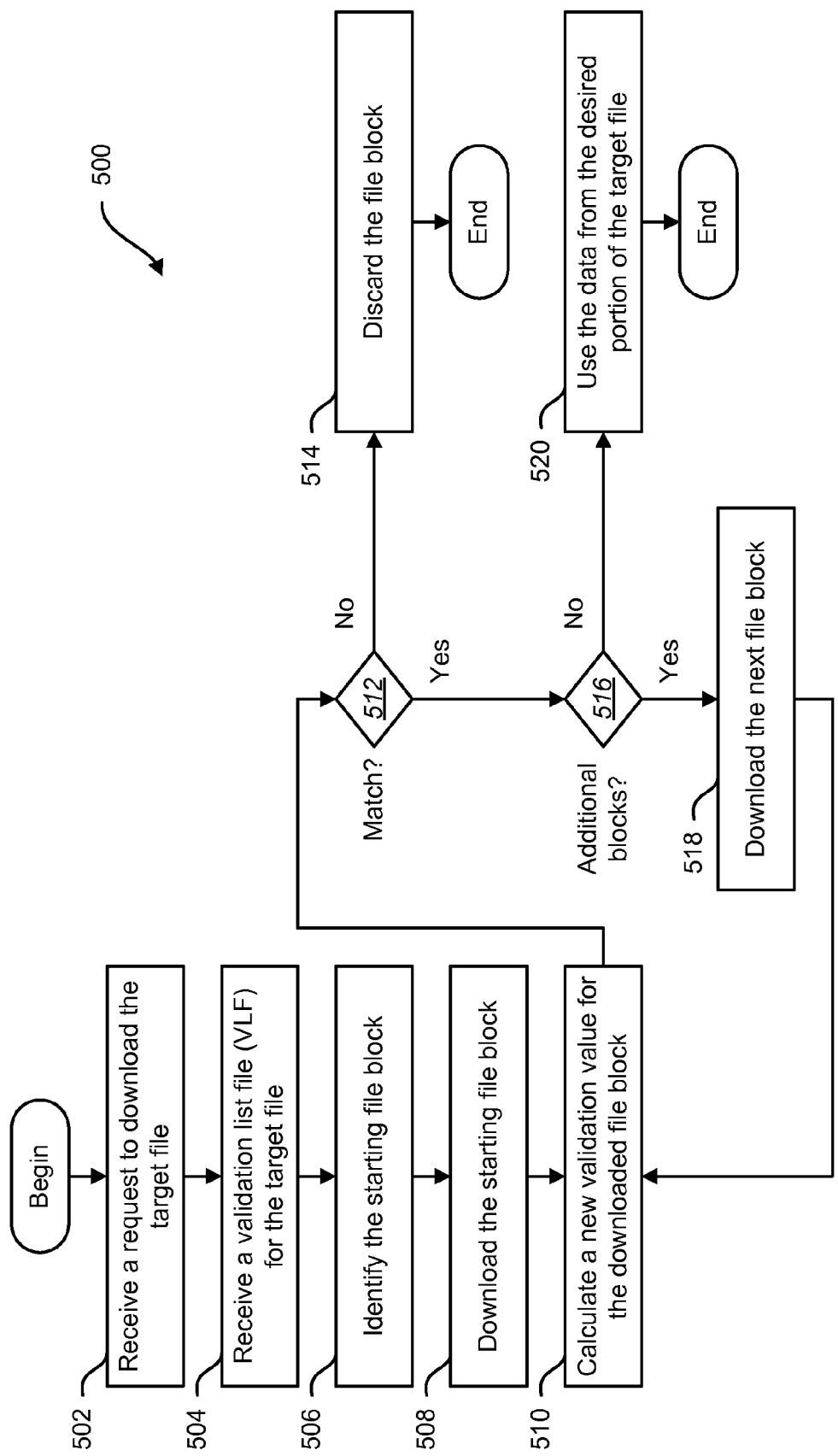
FIG. 5 illustrates an exemplary method that may be performed by an application on a computer system that is downloading a portion of a target file from another computer system.

FIG. 5 illustrates an exemplary method 500 that may be performed by an application on a computer system that is downloading a portion of a target file from another computer system. In the discussion that follows, it will be assumed that the method 500 is being performed by management agent A 118 on managed node A 106 in the system 100 shown in FIG. 1, using the target file 222 shown in FIG. 2 and the VLF 324 shown in FIG. 3.

A request is received 502 from the management server 110 on the administrative system 102 to download a portion of a target file 222 from managed node B 108. A validation list file (VLF) 324 for the target file 222 is also received 504 from the administrative system 102.

The starting file block is identified 506 using the VLF 324. The starting file block is the first file block in the target file 222 that contains the desired portion of the target file 222. The starting file block is downloaded 508 from managed node B 108. In the illustrated embodiment, the remaining portion of the target file 222 is not downloaded at this time.

A new validation value is calculated 510 for the downloaded file block. It is then determined 512 whether the new validation value for the downloaded file block matches the previously calculated validation value for that file block found in the VLF 324. If the new validation value does not match the previously calculated validation value, then the downloaded file block is discarded 514 and the method ends. However, if the new validation value matches the previously calculated validation value, then it is determined 516 whether there are additional file blocks to be downloaded. If there are additional file blocks to be downloaded, the next file block is downloaded 518 from managed node B 108, and the method 500 returns to step 510 and proceeds as described above. If there are not any more file blocks to be downloaded, the data from the desired portion of the target file is used 520.

For example, suppose that managed node A 106 receives a request to download bytes 1750-4250 of the target file 222 shown in FIG. 2. If managed node A 106 receives and uses the VLF 324 shown in FIG. 3, then file block B 228 may be downloaded and an attempt may be made to validate the validation value 348 for file block B. If the validation value 348 for file block B is successfully validated, then file block C 230 may be downloaded and an attempt may be made to validate the validation value 350 for file block C. This process may be repeated until file block E 234 (the last file block that contains the desired portion of the target file 222) is downloaded and its validation value 354 is validated.

There are a variety of ways that the method 500 shown in FIG. 5 may be modified. One modification that could be made relates to the order in which the file blocks are downloaded. In the method 500 shown in FIG. 5 the file blocks in the target file 222 are downloaded sequentially (i.e., the first file block that comprises any part of the desired portion of the target file 222 is downloaded first, followed by the next file block, etc.). However, in some embodiments the file blocks in the target file 222 may be downloaded out of sequence.

Another modification that could be made relates to how many validation values are sent to the requesting application (e.g., management agent A 118). In the method 500 shown in FIG. 5, the entire VLF 324 for the target file 222 is sent to the requesting application. Alternatively, in some embodiments only the validation values for the file blocks to be downloaded (i.e., the file blocks that comprise the desired portion of the target file) may be sent to the requesting application.

Also, in the method 500 shown in FIG. 5, file blocks are downloaded one at a time. Alternatively, in some embodiments multiple file blocks may be downloaded simultaneously. For example, all of the file blocks that comprise the desired portion of the target file may be downloaded simultaneously.

In addition, in the method 500 shown in FIG. 5, the administrative system 102 requests that managed node A 106 download the desired portion of the target file 122 from managed node B 108. In an alternative embodiment, the administrative system 102 may request that managed node A 106 download the desired portion of a target file from the administrative system 102 itself.

The exemplary method 500 shown in FIG. 5 has been described with respect to the system 100 shown in FIG. 1. However, the embodiments disclosed herein may be practiced in a wide variety of settings. For example, the embodiments disclosed herein may be used by computer systems that are in electronic communication with one another via a peer-to-peer network. The peer-to-peer network may facilitate peer-to-peer multicast, as described in U.S. patent application Ser. No. 10/112,103, entitled "Facilitating Resource Access Using Prioritized Multicast Responses to a Discovery Request," with inventors David A. Eatough and Gregory P. Olsen, the contents of which are hereby incorporated by reference in their entirety. As another example, the embodiments disclosed herein may be used by a local proxy server or an installable file system to provide secure handling of byte range requests from a peer or server. An example of a proxy server that may be used is an application based bandwidth limiting proxy server, as described in U.S. patent application Ser. No. 09/737,947, entitled "Application Based Bandwidth Limiting Proxies," with inventors David A. Eatough, Alan B. Butt, and Tony N. Sarra, the contents of which are hereby incorporated by reference in their entirety.

Figure 6:
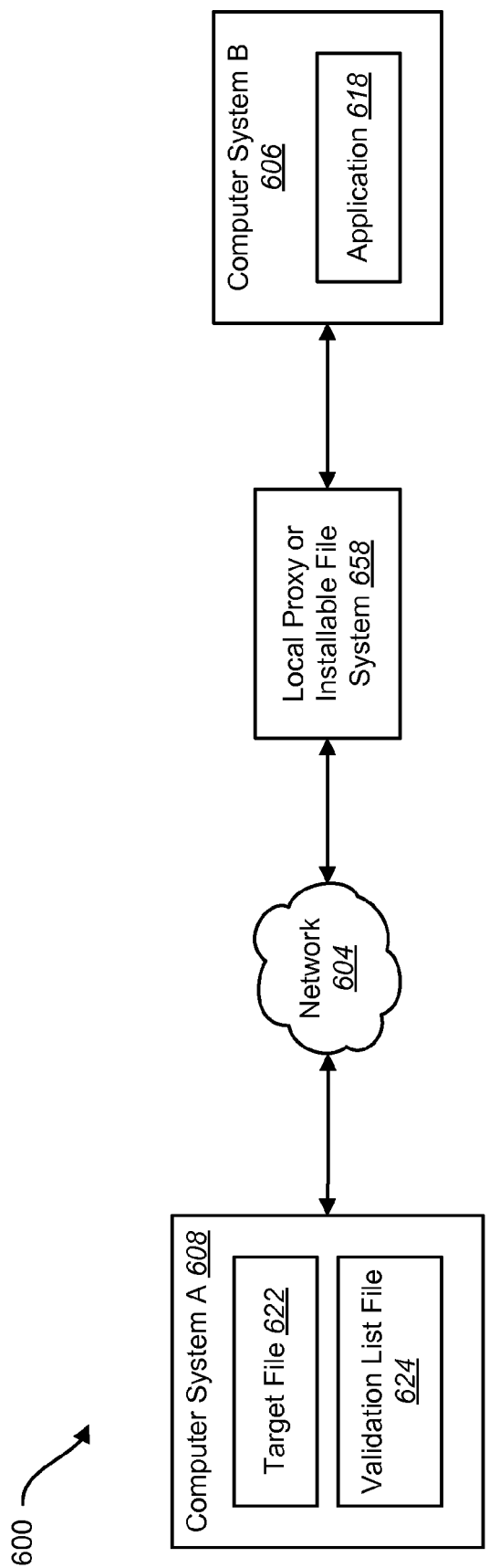
FIG. 6 illustrates another exemplary system in which some embodiments may be practiced, including a local proxy server or installable file system.

An exemplary system 600 that includes a local proxy server or installable file system 658 is shown in FIG. 6. The system 600 shown in FIG. 6 also includes two computer systems, namely computer system A 608 and computer system B 606, that are in electronic communication with one another via a network 604.

If an application 618 on computer system B 606 requests a portion of a target file 622 from computer system A 608, then the local proxy/installable file system 658 may perform one of the methods described herein to validate the portion of the target file 622 that is downloaded. A validation list file (VLF) 624 may be transmitted to the local proxy/installable file system 658. Using the VLF 624, the local proxy/installable file system 658 may determine the file blocks within the target file 622 that contain the desired portion of the target file 622. The local proxy/installable file system 658 may also use the VLF 624 to confirm that the downloaded file blocks have not been altered. Once the downloaded file blocks have been validated, the desired portion of the target file 622 may be transmitted to the requesting application 618 on computer system B 606.

Advantageously, in the illustrated embodiment, it is not necessary for the requesting application 618 on computer system B 606 to receive the VLF 624 and handle the validation values for the file blocks. The requesting application 618 does not need to know how the desired portion of the target file 622 is being validated. Additionally, the desired portion of the target file 622 may be transmitted to the requesting application 618 either with or without any additional data in the downloaded file blocks (i.e., data in the downloaded file blocks that is not part of the desired portion of the target file 622). Therefore, it is not necessary for the requesting application 618 to handle any additional data that may be downloaded.

Figure 7:
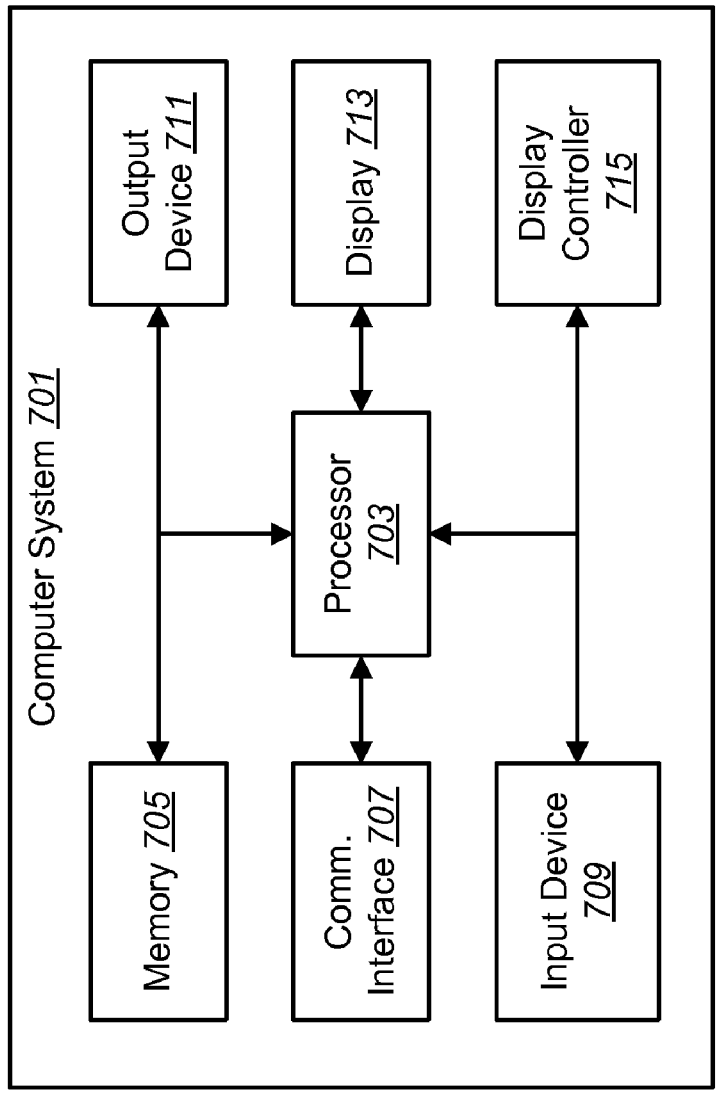
FIG. 7 is a block diagram illustrating the major hardware components typically utilized in a computer system.

FIG. 7 is a block diagram illustrating the major hardware components typically utilized in a computer system 701. The illustrated components may be located within the same physical structure or in separate housings or structures.

The computer system 701 includes a processor 703 and memory 705. The processor 703 controls the operation of the computer system 701 and may be embodied as a microprocessor, a microcontroller, a digital signal processor (DSP) or other device known in the art. The processor 703 typically performs logical and arithmetic operations based on program instructions stored within the memory 705.

As used herein, the term memory 705 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 705 typically stores program instructions and other types of data. The program instructions may be executed by the processor 703 to implement some or all of the methods disclosed herein.

The computer system 701 typically also includes one or more communication interfaces 707 for communicating with other electronic devices. The communication interfaces 707 may be based on wired communication technology, wireless communication technology, or both. Examples of different types of communication interfaces 707 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 701 typically also includes one or more input devices 709 and one or more output devices 711. Examples of different kinds of input devices 709 include a keyboard, mouse, microphone, remote control device, button, joystick, trackball, touchpad, lightpen, etc. Examples of different kinds of output devices 711 include a speaker, printer, etc. One specific type of output device which is typically included in a computer system is a display device 713. Display devices 713 used with embodiments disclosed herein may utilize any suitable image projection technology, such as a cathode ray tube (CRT), liquid crystal display (LCD), light-emitting diode (LED), gas plasma, electroluminescence, or the like. A display controller 715 may also be provided, for converting data stored in the memory 705 into text, graphics, and/or moving images (as appropriate) shown on the display device 713.

Of course, FIG. 7 illustrates only one possible configuration of a computer system 701. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a first computer system, a method for validating a desired portion of a target file that is downloaded from a second computer system, comprising:
   receiving a request from a third computer system to download the desired portion of the target file from the second computer system, wherein:
      the request is not received in response to a request sent from the first computer system to the third computer system,
      the third computer system is an administrative system,
      the administrative system comprises a management server, a database of information, components configured to perform scheduling and to handle alerts, and a management application, the management application performs remote control, software distribution, software license monitoring, operating system imaging and migration, IT asset management, and problem resolution, the first computer system comprises a management agent, and the request to download the desired portion of the target file from the second computer system is received by the management agent from the management application;

receiving a validation list file, wherein the validation list file is a single file that comprises both previously calculated validation values for file blocks within the target file and file block information;

identifying one or more file blocks within the target file that comprise the desired portion of the target file, wherein the desired portion of the target file is something less than the entire target file, wherein identifying the one or more file blocks comprises accessing the validation list file, wherein the validation list file is received by the first computer system before the one or more file blocks within the target file are identified by the first computer system, and wherein the validation list file is created by the management application of the administrative system prior to the management agent receiving the request to download the desired portion of the target file from the second computer system from the management application;

downloading from the second computer system at least one of the one or more file blocks without downloading the entire target file;

accessing from the validation list file a previously calculated validation value for a file block that has been downloaded, wherein the file block is something less than the entire target file, and wherein the previously calculated validation value does not correspond to any part of the target file other than the file block;

calculating a new validation value for the file block; and if the new validation value for the file block does not match the previously calculated validation value for the file block, discarding the file block.

2. The method of claim 1, wherein the file block information comprises starting and ending points of the file blocks in the target file.

3. The method of claim 1, wherein the file block information comprises size information for the file blocks in the target file.

4. The method of claim 1, wherein the validation list file comprises a digital signature, and further comprising attempting to validate the digital signature.

5. The method of claim 1, wherein the validation list file is received via a secure communication channel.

6. The method of claim 1, wherein the validation list file is selected from the group consisting of an XML document, an OpenPGP message, and a binary file.

7. The method of claim 1, further comprising receiving previously calculated validation values only for the one or more file blocks that comprise the desired portion of the target file.

8. The method of claim 1, wherein the previously calculated validation value and the new validation value are selected from the group consisting of a checksum, an MD5 hash value, an SHA-1 hash value, a portion of an SHA-1 hash value, and the first 8 bytes of an SHA-1 hash value.

9. The method of claim 1, wherein downloading at least one of the one or more file blocks comprises downloading one file block at a time.

10. The method of claim 1, wherein downloading at least one of the one or more file blocks comprises downloading multiple file blocks simultaneously.

11. The method of claim 1, wherein all file blocks within the target file are equally sized.

12. The method of claim 1, wherein at least some file blocks within the target file are unequally sized.

13. The method of claim 1, wherein the first computer system is a first managed node on a computer network, wherein the second computer system is a second managed node on the computer network, and wherein the third computer system is an administrative system on the computer network.

14. The method of claim 1, wherein the first computer system is selected from the group consisting of an installable file system and a local proxy.

15. The method of claim 1, wherein the first computer system and the second computer system are in electronic communication with one another via a peer-to-peer network.

16. The method of claim 1, wherein the first computer system is a managed node on a computer network, and wherein the second computer system and the third computer systems are an administrative system for the computer network.

17. The method of claim 1, wherein the target file is a CAB file, and wherein the one or more file blocks are aligned with files contained in the CAB file.

18. The method of claim 1, wherein the one or more file blocks are downloaded out of sequence.

19. The method of claim 1, wherein the validation list file comprises validation values only for file blocks within the target file that are to be downloaded.

20. A first computer system that is configured to validate a desired portion of a target file that is downloaded from a second computer system, the first computer system comprising:

a processor;

memory in electronic communication with the processor;

instructions stored in the memory, the instructions being executable to:

receive a request from a third computer system to download the desired portion of the target file from the second computer system, wherein:

the request is not received in response to a request sent from the first computer system to the third computer system, the third computer system is an administrative system, the administrative system comprises a management server, a database of information, components configured to perform scheduling and to handle alerts, and a management application, the management application performs remote control, software distribution, software license monitoring, operating system imaging and migration, IT asset management, and problem resolution, the first computer system comprises a management agent, and the request to download the desired portion of the target file from the second computer system is received by the management agent from the management application;

receive a validation list file, wherein the validation list file is a single file that comprises both previously calculated validation values for file blocks within the target file and file block information, and wherein the validation list file is created by the management application of the administrative system prior to the management agent receiving the request to download the desired portion of the target file from the second computer system from the management application;

identify one or more file blocks within the target file that comprise the desired portion of the target file, wherein the desired portion of the target file is something less than the entire target file, wherein identifying the one or more file blocks comprises accessing the validation list file, wherein the validation list file is received by the first computer system before the one or more file blocks within the target file are identified by the first computer system;

download from the second computer system at least one of the one or more file blocks without downloading the entire target file;

access from the validation list file a previously calculated validation value for a file block that has been downloaded, wherein the file block is something less than the entire target file, and wherein the previously calculated validation value does not correspond to any part of the target file other than the file block;

calculate a new validation value for the file block; and if the new validation value for the file block does not match the previously calculated validation value for the file block, discard the file block.

21. A computer-readable storage medium for validating a desired portion of a target file that is downloaded from a second computer system, the computer-readable storage medium comprising executable instructions for:

receiving a request from a third computer system to download the desired portion of the target file from the second computer system, wherein:

the request is not received in response to a request sent from the first computer system to the third computer system, the third computer system is an administrative system, the administrative system comprises a management server, a database of information, components configured to perform scheduling and to handle alerts, and a management application, the management application performs remote control, software distribution, software license monitoring, operating system imaging and migration, IT asset management, and problem resolution, the first computer system comprises a management agent, and the request to download the desired portion of the target file from the second computer system is received by the management agent from the management application;

receiving a validation list file, wherein the validation list file is a single file that comprises both previously calculated validation values for file blocks within the target file and file block information, and wherein the validation list file is created by the management application of the administrative system prior to the management agent receiving the request to download the desired portion of the target file from the second computer system from the management application;

identifying one or more file blocks within the target file that comprise the desired portion of the target file, wherein the desired portion of the target file is something less than the entire target file, wherein identifying the one or more file blocks comprises accessing the validation list file, wherein the validation list file is received by the first computer system before the one or more file blocks within the target file are identified by the first computer system;

downloading from the second computer system at least one of the one or more file blocks without downloading the entire target file;

accessing from the validation list file a previously calculated validation value for a file block that has been downloaded, wherein the file block is something less than the entire target file, and wherein the previously calculated validation value does not correspond to any part of the target file other than the file block;

calculating a new validation value for the file block; and if the new validation value for the file block does not match the previously calculated validation value for the file block, discarding the file block.

* * * * *